(12) United States Patent
Brizzi et al.

(10) Patent No.: US 11,034,240 B2
(45) Date of Patent: Jun. 15, 2021

(54) METHOD FOR A SPEED CONTROLLER

(71) Applicant: Continental Teves AG & Co. oHG, Frankfurt (DE)

(72) Inventors: Andreas Brizzi, Wehrheim (DE); Johannes Bufe, Budenheim (DE); Kerstin Grohmann, Frankfurt am Main (DE); Frank Haller, Bad Homburg (DE); Benjamin Jüstel, Frankfurt (DE); Jörg Kaiser, Frankfurt am Main (DE); Philipp Marioneck, Darmstadt (DE)

(73) Assignee: Continental Teves AG & Co. oHG

( * ) Notice: Subject to any disclaimer, the term of this patent is extended or adjusted under 35 U.S.C. 154(b) by 178 days.

(21) Appl. No.: 16/078,158

(22) PCT Filed: Feb. 23, 2017

(86) PCT No.: PCT/EP2017/054137
§ 371 (c)(1),
(2) Date: Aug. 21, 2018

(87) PCT Pub. No.: WO2017/144572
PCT Pub. Date: Aug. 31, 2017

(65) Prior Publication Data
US 2019/0084417 A1 Mar. 21, 2019

(30) Foreign Application Priority Data
Feb. 25, 2016 (DE) ............ 10 2016 202 951.7

(51) Int. Cl.
*B60K 31/04* (2006.01)
*B60T 7/12* (2006.01)
(Continued)

(52) U.S. Cl.
CPC ........... *B60K 31/045* (2013.01); *B60T 7/122* (2013.01); *B60W 30/143* (2013.01);
(Continued)

(58) Field of Classification Search
None
See application file for complete search history.

(56) References Cited

U.S. PATENT DOCUMENTS 5,090,511 A * 2/1992 Kabasin ............... B60K 28/16
180/197
5,563,790 A * 10/1996 Wada ................. B62D 5/0436
701/41

(Continued)

FOREIGN PATENT DOCUMENTS

| DE | 102007021019 A1 | 11/2008 |
| DE | 102013224985 A1 | 6/2015 |

(Continued)

OTHER PUBLICATIONS

German Search Report for German Application No. 10 2016 202 951.7, dated Dec. 13, 2016, with partial translation—10 pages.
(Continued)

*Primary Examiner* — Kaveh Abrishamkar
(74) *Attorney, Agent, or Firm* — RatnerPrestia

(57) ABSTRACT

A method for a speed controller for a motor vehicle, wherein a speed prescription is set by the driver and automatic adjustment of the speed to the speed prescription is carried out at least by setting an engine torque prescription, wherein at the start of the speed control the engine torque prescription is set to an initial value, wherein the initial value is determined in accordance with at least one parameter.

10 Claims, 1 Drawing Sheet

(51) Int. Cl.
   *B60W 30/18*     (2012.01)
   *B60W 30/14*     (2006.01)

(52) U.S. Cl.
   CPC .... *B60W 30/146* (2013.01); *B60W 30/18118* (2013.01); *B60T 2201/06* (2013.01); *B60T 2210/16* (2013.01); *B60T 2230/04* (2013.01)

(56) References Cited

U.S. PATENT DOCUMENTS

| | | | | |
|---|---|---|---|---|
| 6,000,221 | A * | 12/1999 | Church | F02B 37/24 |
| | | | | 60/602 |
| 9,630,623 | B2 * | 4/2017 | Fairgrieve | F16H 61/0213 |
| 2008/0065328 | A1 * | 3/2008 | Eidehall | G01S 13/867 |
| | | | | 701/301 |
| 2008/0208408 | A1 * | 8/2008 | Arbitmann | B60W 40/10 |
| | | | | 701/41 |
| 2009/0063000 | A1 | 3/2009 | Kodama et al. | |
| 2010/0256869 | A1 * | 10/2010 | Lich | B60W 40/10 |
| | | | | 701/41 |
| 2011/0035106 | A1 * | 2/2011 | Hauler | B62D 15/0265 |
| | | | | 701/41 |
| 2011/0234390 | A1 * | 9/2011 | Danner | B62D 15/025 |
| | | | | 340/438 |
| 2011/0282558 | A1 | 11/2011 | Park | |
| 2012/0109465 | A1 * | 5/2012 | Svensson | B60W 10/20 |
| | | | | 701/42 |
| 2013/0338877 | A1 * | 12/2013 | Straus | G08G 1/161 |
| | | | | 701/41 |
| 2014/0067252 | A1 * | 3/2014 | Knoop | B60W 10/184 |
| | | | | 701/400 |
| 2014/0257664 | A1 * | 9/2014 | Arbitmann | B60L 7/26 |
| | | | | 701/71 |
| 2015/0158385 | A1 | 6/2015 | Gauger | |
| 2016/0200317 | A1 * | 7/2016 | Danzl | B60W 10/10 |
| | | | | 701/25 |
| 2016/0221575 | A1 * | 8/2016 | Posch | B60W 30/14 |
| 2017/0326981 | A1 * | 11/2017 | Masui | G08G 1/166 |
| 2019/0064848 | A1 * | 2/2019 | Hofsaess | H04W 4/44 |

FOREIGN PATENT DOCUMENTS

| | | |
|---|---|---|
| GB | 2507622 A | 5/2014 |
| GB | 2511841 A | 9/2014 |
| WO | 2005120915 A1 | 12/2005 |
| WO | 2013124321 A1 | 8/2013 |
| WO | 2014027071 A1 | 2/2014 |
| WO | 2015010964 A1 | 1/2015 |

OTHER PUBLICATIONS

International Search Report and Written Opinion for International Application No. PCT/EP2017/054137, dated May 11, 2017—8 pages.

* cited by examiner

METHOD FOR A SPEED CONTROLLER

CROSS REFERENCE TO RELATED APPLICATIONS

This application is the U.S. National Phase Application of PCT International Application No. PCT/EP2017/054137, filed Feb. 23, 2017, which claims priority to German Patent Application No. 10 2016 202 951.7, filed Feb. 25, 2016, the contents of such applications being incorporated by reference herein.

FIELD OF THE INVENTION

The invention relates to a method for a speed controller for a motor vehicle, wherein a speed prescription is set by the driver and automatic adjustment of the speed to the speed prescription is carried out at least by setting an engine torque prescription.

BACKGROUND OF THE INVENTION

When a speed controller is activated from the stationary state uphill on a steep slope, there is the risk of the vehicle rolling back before the speed controller starts to accelerate the vehicle forward. The speed control function permits rolling back of the vehicle in such a case. The controller only subsequently detects a difference in speed and starts the uphill control.

When speed controllers are activated they are usually initialized with a permanently predefined starting value for an engine torque and a braking torque. It takes some time under certain circumstances for the controller to reach an engine torque corresponding to the inclination and the resistance which the vehicle has to overcome. This can lead to a situation in which in off-road situations with a high degree of resistance (e.g. sand or mud) the vehicle decelerates and comes to a stop and then, under certain circumstances, becomes stuck.

WO 2005 12 09 15 A1, incorporated by reference herein, discloses a method for activating a starting aid, in which states of the vehicle and/or of the surroundings are evaluated with respect to detection of an off-road driving situation, and when an off-road driving situation is present the starting aid is activated in a special mode.

However, such a method has the disadvantage that an engine torque auction suitable for starting still has to be prescribed by the driver.

SUMMARY OF THE INVENTION

An aspect of the present invention is a method for automatic speed control which permits comfortable and situation-appropriate starting.

An aspect of the invention is based on the idea that starting can be carried out better if at the start of the speed control the engine torque prescription is set to an initial value, wherein the initial value is determined in accordance with at least one parameter.

In one preferred embodiment of an aspect of the invention, activation of a starting aid function is monitored, wherein, if the starting aid function is activated, a braking torque value is transmitted from the starting aid function to the speed controller and the initial value is determined as a function of the braking torque value.

In this embodiment, it is advantageously detected that the vehicle is in an uphill starting situation. As result of a starting aid function which is known per se, the necessary braking torque for the inclination is included in the brake after the driver releases the braking pedal. At the same time, the control of the engine torque by the speed controller is begun with an adapted initial value in order to prevent rolling back while the brake pressure is reduced. The brake pressure is initially kept at a level which is necessary to hold the vehicle on the slope. Only when the requested engine torque itself is large enough to hold the vehicle is the braking torque reduced slowly by the starting aid function and the engine torque prescription increased further by the speed controller in order to start the vehicle. In this way, gentle uphill starting is achieved and rolling back of the vehicle is prevented.

In a further preferred embodiment of an aspect of the invention, a roadway inclination and/or a quality of the underlying surface are/is acquired, and the roadway inclination and/or the quality of the underlying surface are/is used as parameters for the determination of the initial value. This has the advantage of making available from the beginning an initial value which is adapted to the situation, with the result that starting takes place quickly and comfortably. This both prevents the vehicle from becoming stuck owing to an excessively low selection of the engine torque and avoids jolty starting owing to an excessively high engine torque.

A first adaptation value is advantageously determined in accordance with the roadway inclination, and a second adaptation value is advantageously determined in accordance with the quality of the underlying surface, wherein the sum or the product of the first adaptation value and of the second adaptation value is used for the determination of the initial value.

Suitable adaptation values are preferably acquired by means of driving trials and stored in a memory. A first and a second adaptation value are retrieved on the basis of the information relating to the roadway inclination and quality of the underlying surface which is available to the speed controller. A first engine torque is particular preferably calculated on the basis of the speed prescription which has been set, and the sum of the first engine torque and of the first and second adaptation value is subsequently formed. The sum is used as an engine torque prescription.

In a further preferred embodiment of an aspect of the invention, a table with engine torque initial values as a function of the parameters of roadway inclination, quality of the underlying surface and speed prescription is stored in a memory medium and the initial value is determined on the basis of the table. The engine torque initial values are preferably acquired on the basis of driving trials.

In one preferred embodiment of an aspect of the invention, automatic deceleration of the vehicle to the stationary state is carried out by the speed controller if the speed prescription is zero. As a result, the driver can cause the vehicle to be comfortably braked to the stationary state by means of an input to the speed controller, without the driver having to actuate the brake pedal himself.

If the driver makes an input which results in a speed prescription of zero, initially the engine torque prescription is preferably reduced gradually by the speed controller in order to achieve gentle deceleration of the vehicle.

The speed controller is advantageously configured for adjustment to speeds below approximately 30 km/h, in particular for the off-road mode.

In one preferred embodiment of an aspect of the invention, a transfer to a second speed controller takes place if the speed prescription exceeds a limiting value, in particular 30 km/h. Speed controllers for a low speed range (below approximately 30 km/h) are often embodied separately from speed controllers for a relatively high speed range (above approximately 30 km/h, known as cruise control or adaptive cruise control systems), since the requirements and methods of functioning differ significantly. Known speed controllers are usually deactivated if a speed outside the provided range is set. However, it is much more comfortable for the driver if a transfer takes place directly from one speed controller to the other without his involvement.

The applicable speed prescription is particularly preferably transferred during the transfer.

In one particularly preferred embodiment of an aspect of the invention, a transfer from the second speed controller to the speed controller according to an aspect of the invention takes place if the speed prescription undershoots a limiting value, in particular 30 km/h. This permits a comfortable transfer between the controllers in both directions

BRIEF DESCRIPTION OF THE DRAWINGS

An exemplary embodiment of an aspect of the invention will be discussed in more detail on the basis of two drawings. In the drawing, in a highly schematic illustration.

DETAILED DESCRIPTION OF THE PREFERRED EMBODIMENTS

Figure 1:
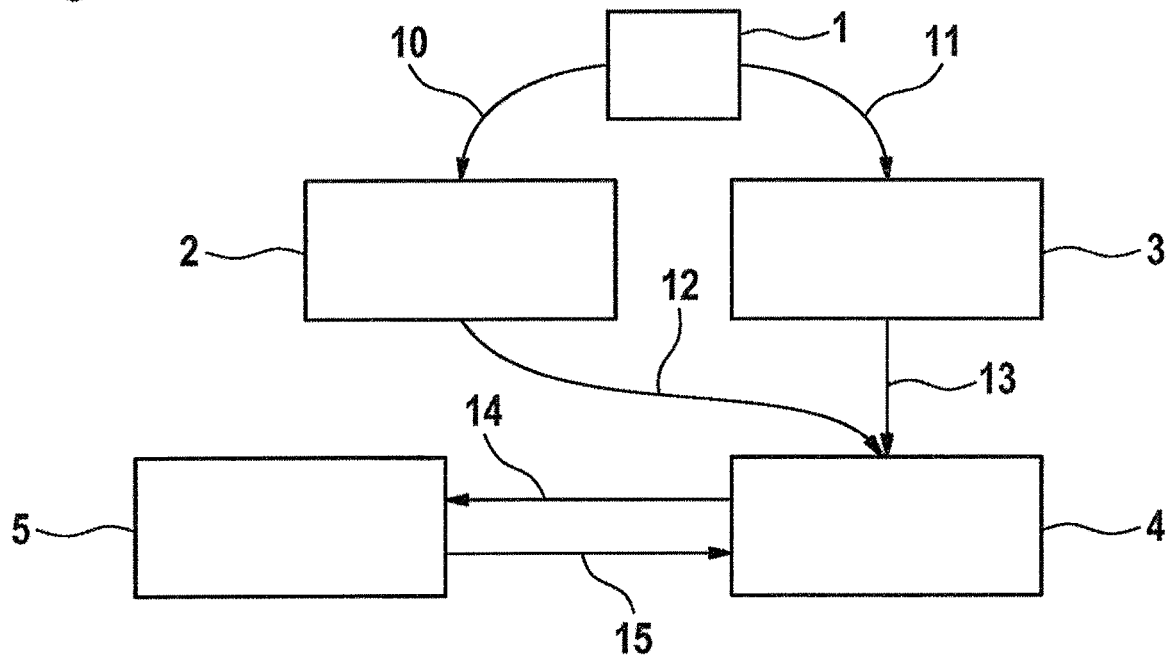
FIG. 1 shows a schematic diagram of an exemplary speed controller.

FIG. 1 shows a schematic diagram of an exemplary speed controller.

In the basic state 1, the speed controller is initially switched off. If the driver actuates a first switch (illustrated by means of arrow 10 in FIG. 1) with the brake pedal depressed, the system changes into a standby mode 2. In the standby mode 2 there is still no request for braking torque or engine torque.

If the driver activates the system in the stationary state, by releasing the brake (arrow 12) he can change into an active mode 4 and bring about starting, wherein the vehicle accelerates to a previously set target speed (speed prescription). The standard target speed is a preset minimum target speed, but it can be changed by the driver before the starting.

However, a transfer into the active mode advantageously takes place only if the driver releases the brake within a predefined time period and the vehicle is not in a parking mode.

The target speed (in the range from the minimum target speed to the maximum target speed) is set with pushbutton keys "set+" and "set−", wherein these can both be pressed briefly in order to change the speed incrementally, and pressed and held down in order to bring about a more rapid change.

If activation occurs during travel (arrow 11), the system initially changes into a second standby mode 3. The automatic control of the speed can then start in that the driver actuates the "set+" switch (arrow 13) and the control therefore goes into the active mode 4.

The current vehicle speed is initially adapted as the preset target speed. The control advantageously starts only when the current vehicle speed is within a predefined permitted speed range.

During operation, the speed controller can be switched off again at any time by pressing the first switch.

If a situation in which the current vehicle speed is higher than the target speed occurs while the speed controller is active, the current vehicle speed can be adapted as the new target speed by pressing "set+".

Conversely, in a situation in which the current vehicle speed is lower than the target speed, said speed can be adapted as the new target speed by pressing "set−".

If the driver actuates the accelerator while the speed controller is active, and as a result reduces the actual speed of the vehicle, the target speed follows the actual speed. When the brake is released, adjustment to the new target speed then takes place.

The actuation of the accelerator pedal while the speed controller is active does not bring about a change in the target speed, but can cause the vehicle to accelerate. If the pedal is released, adjustment to the target speed takes place again.

When the speed controller is active, the control can be (temporarily) interrupted by means of a cancel pushbutton key, wherein the target speed is not deleted but rather buffered.

After previous pressing of the cancel pushbutton key, it is possible to return to the previously interrupted control (including the buffered target speed) using a resume pushbutton key.

If the speed controller is active (mode 4) and the vehicle is moving at the minimum target speed, the driver can stop by keeping the key "set−" pressed (arrow 14). Automatic deceleration of the vehicle to the stationary state (state 5) is carried out by the speed controller. If the driver releases the key "set−" again (arrow 15), the speed controller returns to the active mode 4 and continues the control with the minimum target speed.

Figure 2:
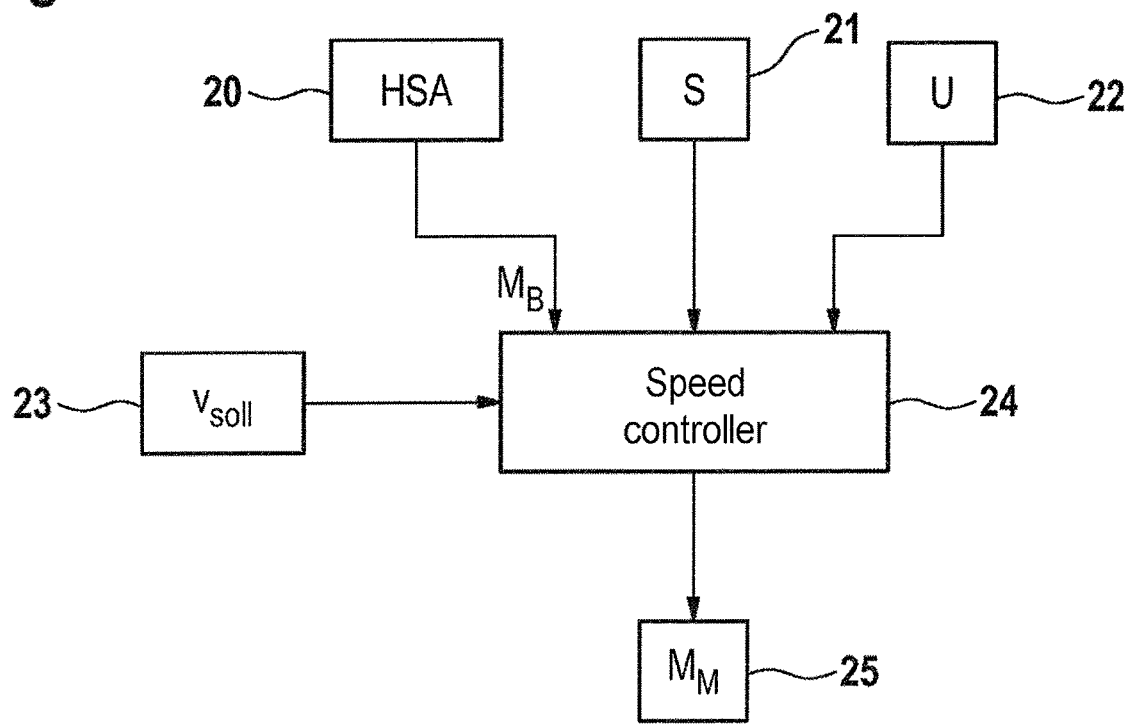
FIG. 2 shows a device for carrying out the exemplary method.

FIG. 2 shows a device for carrying out the exemplary method. A speed controller 24 receives a braking torque value MB from a starting aid 20 (HSA) if the latter is active.

The driver sets a speed prescription $v_{soll}$ by means of an operator control element 23. The operator control element can comprise a plurality of pushbutton keys, for example a first switch for activating the function, and switches "set+" and "set−" for setting the speed prescription $v_{soll}$. The speed prescription $v_{soll}$ is transferred to the speed controller 24.

The speed controller 24 also receives information about a roadway inclination S from an inclination sensor 21 and a quality U of an underlying surface 22. The quality of the underlying surface is preferably either determined on the basis of a surroundings sensor system, or set by the driver by means of an operator control element.

The inclination S is advantageously determined by means of a G sensor while the vehicle is in the stationary state.

On the basis of the received information about the braking torque value $M_M$ of the starting aid, the roadway inclination S, the quality U of the underlying surface and the speed prescription $v_{soll}$, the speed controller 24 determines a suitable initial value for the engine torque prescription $M_M$ and transfers it to an actuator 25 which sets the engine torque in accordance with the engine torque prescription $M_M$ when the speed controller is activated.

The necessary engine torque for the prevailing condition of the roadway is stored, for example, in a table in which the roadway inclination S, the quality U of the underlying surface, the speed prescription $v_{soll}$ and the necessary engine torque $M_M$ re stored. These values are run in driving trials on the corresponding roadways and inclinations. The initialization value can then be correspondingly composed, e.g. by adding a first adaptation value which is acquired in accordance with the inclination S and a second adaptation value which is acquired in accordance with the quality U of the underlying surface (e.g. uphill in sand), or only part of the inclination or part of the roadway.

An initial value, which is used as an engine torque prescription when the speed controller is activated, is preferably determined continuously by means of the speed controller.

The invention claimed is:

1. A method for a speed controller for a motor vehicle, comprising:
    setting a speed prescription by a driver;
    prior to the start of the speed control, setting an engine torque prescription to an initial value for use during the start of the speed control;
    wherein the initial value is determined in accordance with at least one parameter detected by a sensor of the motor vehicle and set when the speed control is activated, the initial value is computed for the at least one parameter during prior driving trials in another vehicle; and
    when the vehicle is stationary, and the driver turns ON the speed controller, and the driver releases a brake of the vehicle within a predetermined time, the speed controller performs an automatic control of the speed to accelerate the vehicle to the speed prescription.

2. The method as claimed in claim 1, wherein activation of a starting aid function is monitored, and wherein, if the starting aid function is activated, a braking torque value is transmitted from the starting aid function to the speed controller and the initial value is determined as a function of the braking torque value.

3. The method as claimed in claim 2, further comprising:
    acquiring a roadway inclination and/or a quality of the underlying surface, and
    using the roadway inclination and/or the quality of the underlying surface as parameters for the determination of the initial value.

4. The method as claimed in claim 1, further comprising:
    acquiring a roadway inclination and/or a quality of the underlying surface, and
    using the roadway inclination and/or the quality of the underlying surface as parameters for the determination of the initial value.

5. The method as claimed in claim 4, further comprising:
    determining a first adaptation value in accordance with the roadway inclination,
    determining a second adaptation value in accordance with the quality (U) of the underlying surface, and
    wherein using the sum or the product of the first adaptation value and of the second adaptation value for the determination of the initial value.

6. The method as claimed in claim 4, wherein a table with engine torque initial values as a function of the parameters of roadway inclination, quality of the underlying surface and speed prescription is stored in a memory medium and the initial value is determined on the basis of the table.

7. The method as claimed in claim 1, wherein automatic deceleration of the vehicle to the stationary state is carried out by the speed controller if the speed prescription is zero.

8. The method as claimed in claim 1, wherein the speed controller is configured for adjustment to speeds below approximately 30 km/h, in particular for an off-road mode.

9. The method as claimed in claim 8, wherein a transfer to a second speed controller takes place if the speed prescription exceeds a limiting value.

10. The method as claimed in claim 8, wherein a transfer to a second speed.

* * * * *